United States Patent [19]

Hitchcock et al.

[11] Patent Number: 5,397,807

[45] Date of Patent: Mar. 14, 1995

[54] COMPATIBILIZED CARBON BLACK AND A PROCESS AND A METHOD FOR USING

[75] Inventors: Martin K. Hitchcock, Newark; Kyung W. Suh, Granville; Arnold M. Bartz, Granville; Andrew N. Paquet, Granville; William G. Stobby, Johnstown, all of Ohio

[73] Assignee: The Dow Chemical Company, Midland, Mich.

[21] Appl. No.: 250,327

[22] Filed: May 27, 1994

Related U.S. Application Data

[63] Continuation of Ser. No. 137,248, Oct. 14, 1993, abandoned.

[51] Int. Cl.6 ............................ C08J 9/00; C08J 9/14; C08J 9/16; C01B 31/02
[52] U.S. Cl. ..................................... 521/76; 423/49.2; 423/449.3; 423/460; 521/56; 521/57; 521/60; 521/79; 521/81; 521/82; 521/86; 521/88; 521/97; 521/98; 521/99; 521/143; 521/145; 521/146; 521/149; 521/155; 521/181; 521/182; 521/183; 523/215
[58] Field of Search ........................ 521/76, 79, 82, 99

[56] References Cited

U.S. PATENT DOCUMENTS

| | | | |
|---|---|---|---|
| 4,164,512 | 8/1979 | Brenner et al. | 521/93 |
| 4,181,780 | 1/1980 | Brenner et al. | 521/93 |
| 4,615,850 | 10/1986 | Pecsok | 264/45.9 |
| 4,675,345 | 6/1987 | Pecsok | 521/82 |
| 4,692,381 | 9/1987 | Pecsok | 428/375 |
| 4,795,763 | 1/1989 | Gluck et al. | 521/99 |
| 5,137,930 | 8/1992 | Soukup | 521/99 |
| 5,149,722 | 9/1992 | Soukup | 521/99 |
| 5,192,607 | 3/1993 | Soukup | 428/314.4 |

FOREIGN PATENT DOCUMENTS

| | | | |
|---|---|---|---|
| 8924240434 | 8/1989 | Germany | C08L 75/04 |
| 61-09125514 | 2/1986 | Japan | C08J 9/04 |
| 62-09125614 | 2/1986 | Japan | C08J 9/04 |
| 61-12858920 | 4/1986 | Japan | B29C 47 |

OTHER PUBLICATIONS

Abstract No. 104:111117d, *Mixing of Carbon Black with Rubber. III. Analysis of the Mixing Torque Curve* by George R. Cotten, 1985.

Abstract No. 104:35240W, *Mixing of Carbon Black with Rubber. II. Mechanism of Carbon Black Incorporation* by George R. Cotten, 1985.

*Primary Examiner*—Morton Foelak
*Attorney, Agent, or Firm*—J. Robert Dean, Jr.

[57] ABSTRACT

Disclosed is a compatibilized carbon black useful in melt processing of plastic material. The carbon black is coated with a compatibilizing agent which enhances the dispersibility of the carbon black in a melt of the plastic material. Further disclosed are processes for making plastic foam structures with the compatibilized carbon black.

13 Claims, No Drawings

COMPATIBILIZED CARBON BLACK AND A PROCESS AND A METHOD FOR USING

CROSS-REFERENCE TO RELATED APPLICATION

This is a continuation of application Ser. No. 08/137,248, now abandoned, filed Oct. 14, 1993.

BACKGROUND OF THE INVENTION

This invention relates to carbon black coated with a compatibilizing agent to enhance its dispersibility in a melt of a plastic material. The invention further relates to a method for enhancing the dispersion of carbon black into a melt of a plastic material. The invention further relates to a process for incorporating carbon black in a plastic foam structure.

Carbon black is known as an infrared radiation absorber and reflector, and has been commercially employed in insulative foam structures to reduce thermal conductivity. Extensive teachings of that use are seen in U.S. Pat. No. 4,795,763 and WO 90/06339, both of which are incorporated by reference herein.

Problems with incorporating carbon black in insulative foam structures include processing problems such as poor dispersion and high process pressures and product quality problems such as poor cellular structure and poor skin quality.

Carbon black does not typically disperse well in a polymer melt or polymer gel of the melt with a blowing agent. Adequate dispersion may require pre-compounding of the carbon black in the base polymer prior to manufacturing the foam structure. Pre-compounding is expensive, and the carbon black still may not be sufficiently dispersed. Adequate dispersion is needed to achieve maximum efficiency in reducing thermal conductivity in the foam structure and to ensure desirably low levels of water and water vapor permeability through the structure.

High process pressures may result from operating process equipment such as extruders at high operating rates to ensure adequate dispersion of the carbon black.

Poor skin quality and poor cellular structure may result from making extruded foam structures with carbon black. If poorly dispersed, carbon black may negatively impact skin quality and cellular structure of the foam structure as it exits the extrusion die. Poor cellular structure may take the form of irregular or uncontrolled cell size, or large voids or abscesses.

One means of enhancing dispersion of carbon in a process for making a foam structure is seen in U.S. Pat. Nos. 5,149,722, 5,137,190, and 5,192,607. In a process for making a polyisocyanurate or a polyurethane foam structure, a capped polyoxyalkylene compound is added to one of the reactive components. A disadvantage of such means is that relatively large amounts of the polyoxyalkylene compound must often be employed to achieve a desirable degree of dispersion. Large amounts are expensive, and may impact critical physical properties of the end product foam structure. Further, the enhancement is taught only with respect to processes for making polyurethane and polyisocyanurate foam structures.

It would be desirable to find a means for enhancing dispersion of carbon black in melts of plastic materials. It would be further desirable to find a means for enhancing dispersion of carbon black in plastic foaming processes. It would be further desirable if skin quality and cellular structure could be improved when using carbon black in extrusion foaming processes.

SUMMARY OF THE INVENTION

According to the present invention, there is compatibilized carbon black useful in melt processing of a plastic material or foaming of such plastic material. The carbon black is coated with a compatibilizing agent which enhances the dispersibility of the carbon black in the melt of the plastic material. A preferred carbon black is referred to as thermal black or thermal grade carbon black.

Further according to the present invention, there is a process for making a plastic polymer foam structure. The process comprises heating a plastic polymer material to form a melt polymer material; incorporating into the melt polymer material a carbon black coated with the compatibilizing agent described above; incorporating into the melt polymer material at an elevated pressure a blowing agent to form a foamable gel; and expanding the foamable gel at a lower pressure to form a foam structure.

Further according to the present invention, there is a method for enhancing dispersion of carbon black in a melt of a plastic material. The method comprises providing the carbon black; applying to the carbon black a compatibilizing agent capable of enhancing the dispersion of the carbon black in the plastic material melt; and incorporating the compatibilized carbon black in the plastic material melt.

Further according to the present invention, there is a process for making a thermoset polymer foam. The process comprises providing a first thermoset monomer; providing a second thermoset monomer the same or different than the first monomer and polymerizable with the first monomer; incorporating into either or both the first and second monomers carbon black coated with a compatibilizing agent capable of enhancing the dispersion of the carbon black in either or both the first and second monomers; incorporating into either or both the first and second monomers a blowing agent; and mixing the first and second monomers under polymerizing conditions to form the thermoset polymer foam. Preferably, the first monomer is an isocyanate and the second monomer is an isocyanate or a polyol.

Further according to the present invention, there is a process for making expandable thermoplastic foam beads. The process comprises providing a first thermoplastic monomer; providing a second thermoplastic monomer the same or different than the first monomer and polymerizable with the first monomer; polymerizing the first and second monomers to form thermoplastic particles; incorporating during polymerization a carbon black coated with a compatibilizing agent capable of enhancing the dispersion of the carbon black in the thermoplastic particles; incorporating a blowing agent into the thermoplastic particles during or after polymerization; and cooling the thermoplastic particles to form the expandable foam beads. Preferred foam beads are polystyrene foam beads.

Further according to the present invention, there is a process for making expandable thermoplastic foam beads. The process comprises heating a thermoplastic material to form a melt polymer material; incorporating into the melt polymer material a carbon black coated with a compatibilizing agent capable of enhancing the dispersion of carbon black in the melt polymer material;

further incorporating into the melt polymer material at an elevated pressure a blowing agent to form a foamable gel; cooling the foamable gel to form an essentially continuous expandable thermoplastic strand; and pelletizing the expandable thermoplastic strand to form expandable thermoplastic foam beads.

DETAILED DESCRIPTION

Suitable plastic materials may be selected from any of those which can be blown into foam. The plastic material may be thermoplastic or thermoset. Suitable plastics include polyolefins, polyvinylchloride, alkenyl aromatic polymers, cellulosic polymers, polycarbonates, polyetherimides, polyamides, polyesters, polyvinylidene chloride, polymethylmethacrylate, polyurethanes, polyisocyanurates, phenolics, copolymers and terpolymers of the foregoing, polymer blends, rubber modified polymers, and the like. Suitable polyolefins include polyethylene and polypropylene. Suitable polyethylenes include those of high, medium, low, linear low, and ultra low density types.

The present foam structure preferably comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{1-4}$ alkyl acids and esters, ionomeric derivatives, and $C_{2-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, methyl methacrylate, butyl acrylate vinyl acetate and butadiene. A preferred structure comprises substantially (i.e. greater than 95 percent) and more preferably entirely polystyrene. Another useful structure comprises styrene/butyl acrylate copolymer.

The compatibilizing agent is a substance which renders the carbon black more dispersible in the melt of a plastic material than corresponding carbon black without the agent. The compatibilizing agent is capable of adhering to or coating the surface of the carbon black, and is further more soluble or dispersible in a melt of a plastic material than carbon black. The compatibilizing agent is preferably in a liquid or solid state at ambient temperature and preferably in a liquid state at elevated temperatures typically associated with foaming of polymers (e.g. 110° C.–135° C. for polystyrene). The compound forms a coating either on a portion of or the entire exposed surface area of the carbon black.

The coating of carbon black with a compatibilizing agent has advantages over prior art methods of adding dispersing agents to foam-forming formulations to enhance dispersion of carbon black. In the present invention, the compatibilizer is applied directly where it is needed—the surface of the carbon black. Thus, relatively smaller amounts of compatibilizing agents agents can be employed to achieve adequate dispersion of a given loading of carbon black than with addition to foam-forming formulations.

Reducing the amount of compatibilizing agent employed has advantages. First, the cost of the agent is reduced. Second, since compatibilizing agents by their nature may impact physical properties of the end-product foam structure, that impact may be relatively less with a reduction in the amount of agent employed.

Suitable compatibilizing agents include but are not limited to fatty acids, ethoxylated fatty acids, and fatty acid esters of 8 to 24 carbon atoms; phthalic esters of 8 to 24 carbon atoms; sorbitan esters; monoglycerides; mineral oils, silicone oils; polyalkylene glycols such as polyethylene glycol and polypropylene glycol, and mixtures of the above. A preferred compound is dibutyl phthalate.

Any means of applying the compatibilizing agent to the carbon black may be employed such as mixing or agitation, spraying, fluidized bed, and ultrasonic dispersion. Preferably, carbon black particles are exposed to the agent in as discrete a particle form as possible, and prior to any pelletization or agglomeration into large aggregates to ensure a more uniform or homogeneous coating. Most preferably, the carbon black particles are exposed to the agent as discrete individual particles or fused micro-aggregates of 2–12 particles. However, the agent may also be applied to the carbon black when the carbon black is pelletized or in the form of large aggregates of numerous particles as in furnace black.

The compatibilizing agent may comprise a solvent or thinner or other liquid vehicle to modify the viscosity or other physical properties of the agent to ensure proper application to the surfaces of the carbon black. Suitable solvents or thinners include water or volatile organic compounds.

The preferred type of carbon black is known in the art as thermal grade carbon black or thermal black. Thermal black is preferred because it disperses more readily than other types of carbon black, and is a more effective radiant attenuator than the other types. Other useful types of carbon black include furnace black, acetylene black, channel black, and lamp black. Additional teachings to carbon black, including thermal black, are seen in the following articles: John Wiley and Sons, *Encyclopedia of Chemical Technology*, Volume 4, Third Edition, Pages 631–666, 1978, Kirk-Othmer, New York; and Harry S. Katz and John V. Milewski, *Handbook of Fillers and Reinforcements for Plastics*, Pages 277–291, 1978, Van Nostrand Reinhold Company, New York. Both articles are incorporated herein by reference. Excellent teachings are also seen in U.S. Ser. No. 07/990,961, which is incorporated herein.

Though carbon black of any particle size or structure may be used in the present foam structure, a preferred particle size is preferably about 150 nanometers or more and most preferably about 200 to about 500 nanometers. Thermal black is commercially available in those particle sizes.

The carbon black is present in a quantity sufficient to reduce the thermal conductivity of the foam structure below that of a corresponding foam structure without the carbon black. The carbon black is preferably present at from about 1.0 to about 25 weight percent and more preferably at from about 4 to about 10 weight percent based on the weight of the polymer material in the foam structure. About 4 to about 10 weight percent carbon black is typically sufficient to substantially dissipate the radiation component of heat in $\frac{3}{8}$ inch (0.95 cm) to 6 inch (15 cm) thick foam panel structures in conventional residential and building insulating applications ($-30°$ C. to $+50°$ C. temperature service range).

Another advantage of the present invention is that the enhanced dispersion of the carbon black may enhance skin quality and cellular structure (reduce incidence of voids).

Thermoplastic polymer foam structures of the present invention are generally prepared by heating a polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. The carbon black may be dry blended with the polymer material or mixed with the polymer melt or the polymer gel by any of the means described above. Optionally, a nucleator may be blended in the polymer melt or dry blended with the polymer material prior to plasticizing or melting. The foamable gel is typically cooled to a lower temperature to optimize physical characteristics of the foam structure. The gel may be cooled by any means known in the art such as in the cooling zone of an extruder or by in-line coolers. The gel is then extruded through a die of desired shape to a zone of lower pressure to form the foam structure. The zone of lower pressure is at a pressure lower than that in which the foamable gel is maintained prior to extrusion through the die. The lower pressure may be superatmospheric or subatmospheric (vacuum), but is preferably at an atmospheric level.

Though the preferred process for making the present structure is an extrusion process, it is understood that the above structure may be formed by expansion of expandable beads containing a blowing agent. The beads may be molded at the time of expansion to form articles of various shapes. Processes for making pre-expanded beads and molded expanded bead foam articles are taught in *Plastic Foams, Part II,* Frisch and Saunders, pp. 544–585, Marcel Dekker, Inc. (1973) and *Plastic Materials,* Brydson, 5th ed., pp. 426–429, Butterworths (1989), which are incorporated herein by reference.

Compatibilized carbon black may be incorporated into bead foam in several ways. The carbon black may be incorporated during polymerization of expandable beads or may be incorporated into a melt of the polymer during preparation of the expandable beads.

Thermoset polymer foam structures such as polyurethane and polyisocyanurate foam structures may be prepared according to the present invention.

Polyurethane and polyisocyanurate foam structures are usually made by reactive foaming of two preformulated components, commonly called the A-component and the B-component. The A-component is an isocyanate, and the B-component is an isocyanate or a polyol. The carbon black and the blowing agent may be dispersed in either the isocyanate or the polyol or both.

Suitable polyisocyanates include diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenyl methane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4',4"-triphenylmethanetriisocyanate, polymethylenepolyphenyl isocyanate, toluene-2,4,6-triisocyanate; and the tetraisocyanates such as 4,4'-dimethyldiphenylmethane-2,2',5,5'-tetraisocyanate.

Suitable polyols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinitol; mannitol; sorbitol; formitol; a-methylglucoside; diethylene glycol; triethylene glycol; tetraethylene glycol and higher polyethylene glycols; dipropylene glycol and higher polypropylene glycols as well as dibutylene glycol and higher polybutylene glycols. Suitable polyols further include oxyalkylene glycols, such as diethylene glycol, dipropylene glycol, triethylene glycol, tripropylene glycol, tetraethylene glycol, tetrapropylene glycol, trimethylene glycol and tetramethylene glycol.

The polyurethane foams can be prepared by reacting the polyol and the isocyanate on a 0.7:1 to 1.1:1 equivalent basis. The polyisocyanurate foams of the invention are advantageously prepared by reacting the polyisocyanate with a minor amount of polyol to provide about 0.10 to 0.70 hydroxyl equivalents of polyol per equivalent of polyisocyanate. Useful polyurethanes and polyisocyanurates and processes for making them are seen in U.S. Pat. No. 4,795,763, which is incorporated herein by reference.

The selection of blowing agent is not critical to the present invention. Useful blowing agents include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–9 carbon atoms and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane, 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine.

The amount of blowing agent incorporated into the polymer melt material to make a foam-forming polymer gel is from about 0.2 to about 5.0, preferably from about 0.5 to about 3.0, and most preferably from about 1.0 to 2.50 moles per kilogram of polymer.

The foam component of the present foam structure preferably has a density of from about 10 to about 150 and most preferably from about 10 to about 70 kilograms per cubic meter. The foam preferably has an average cell size of from about 0.05 to about 5.0 and preferably from about 0.1 to about 1.5 millimeters according to ASTM D3576.

The foam component of the present foam structure may be closed cell or open cell depending upon the application. For most insulating applications, the present foam is desirably greater than 90 percent closed-cell according to ASTM D2856-A. A closed-cell structure substantially reduces convection effects, diffusion of insulating gas, and permeation of water vapor.

Various additives may be incorporated in the present foam structure such as inorganic fillers, pigments, antioxidants, acid scavengers, ultraviolet absorbers, flame retardants, processing aids, extrusion aids, and the like.

In addition, a nucleating agent may be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed preferably ranges from about 0.01 to about 5 parts by weight per hundred parts by weight of a polymer resin. A more preferred range is from 0.1 to about 3 parts by weight.

According to the present invention, the present foam structure may be used to insulate a surface or an enclosure by applying to the surface or enclosure an insulating panel fashioned from the present structure. Such panels are useful in any insulating surfaces or enclosures such as houses, roofing, buildings, refrigerators, freezers, appliances, and the like.

The present foam structure may be formed into a plurality of discrete foamed particles for conventional loose-fill cushioning and packaging applications, or may be ground into scrap for use as blown insulation.

The following are examples of the present invention, and are not to be construed as limiting. Unless otherwise indicated, all percentages, parts, or proportions are by weight.

EXAMPLES AND CONTROL EXAMPLE

Insulative polystyrene foam structures of the present invention are made with compatibilized carbon black according to the process of the present invention. The manufacture of a control polystyrene foam structure with untreated or non-compatibilized carbon black was also attempted.

The apparatus comprised a single-screw extruder and a die in series.

A polystyrene resin of 195,000 weight average molecular weight according to size exclusion chromatography was employed. A blowing agent mixture of 3.48 parts per hundred (pph) carbon dioxide and 1.5 pph ethyl chloride based upon the resin weight was employed. Small amounts of hexabromocyclododecane and magnesium oxide were added as a fire retardant and an acid scavenger, respectively.

Compatibilized carbon black was employed at two different levels, 4.3 and 6.9 pph based upon resin weight. The compatibilized carbon black was a thermal black of an average particle size of 320 nanometers spray coated with dibutyl phthalate in an amount of 1 (one) weight percent based upon thermal black weight. The coating was sprayed on the powder form of thermal black prior to pelletization to final product form to enhance the uniformity of the coating.

The polystyrene, the carbon black, and the additives were fed to and melt-blended in the extruder. The blowing agent was injected into the melt blend at the mixer to form a foamable gel. The temperature of the foamable gel was reduced in the coolers, and extruded through the die to form the foam structure.

The present foam structures exhibited a generally homogeneous dispersion of the thermal black, and was relatively free of voids.

The present foam structures were tested for various physical properties, including thermal conductivity or k-factor, cell size, and density. The thermal conductivity of the structures was desirably low. The results are seen in Table 1.

A corresponding control foam structure with untreated or non-compatibilized carbon black at 6 pph was attempted, but could not be made with an acceptable degree of carbon black dispersion.

TABLE 1

| Physical Properties of the Foam Structures of Example 1 | | | | |
|---|---|---|---|---|
| Run | Carbon black (pph)$^a$ | btu · in/hr · ft$^2$ · F.° (W/m · K.°)$^b$ | Cell Size (mm)$^c$ | Density pcf (kg/m$^3$)$^d$ |
| 1 | 4.3 | 0.207 (0.029) | 0.25 | 2.38 (38.1) |
| 2 | 6.3 | 0.215 (0.031) | 0.36 | 2.78 (44.5) |

$^a$Parts per hundred of carbon black based upon resin weight
$^b$btu · inch/hour · (feet)$^2$ · F.° (Watts/meter · K.°)
$^c$mm = millimeters
$^d$pcf = pounds/cubic foot; kg/m$^3$ = kilograms/cubic meter While embodiments of the foam structure and the process of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A process for making a plastic polymer foam structure, comprising:
   a) heating a plastic polymer material to form a melt polymer material;
   b) incorporating into the melt polymer material a carbon black coated with a compatibilizing agent selected from the group consisting of fatty acids of 8-24 carbon atoms, ethoxylated fatty acids of 8-24 carbon atoms, fatty acid esters of 8-24 carbon atoms, phthalic esters of 8-24 carbon atoms, sorbitan esters, monoglycerides, mineral oils, silicone oils, and polyethylene glycols;
   c) further incorporating into the melt polymer material at an elevated pressure a blowing agent to form a foamable gel; and
   d) expanding the foamable gel at a lower pressure to form a foam structure.

2. The process of claim 1, wherein the carbon black is thermal black.

3. The process of claim 1, wherein the carbon black is furnace black.

4. The process of claim 1, wherein the compatibilizing agent is dibutyl phthalate.

5. The process of claim 1, wherein the foamable gel is expanded by extruding it through a die to a zone of lower pressure to form the foam structure.

6. The process of claim 5, wherein the foamable gel is cooled to an optimum foaming temperature prior to extrusion through the die.

7. The process of claim 6, wherein a nucleating agent is incorporated into the melt polymer material.

8. The process of claim 1, wherein the plastic material is a polystyrene.

9. The process of claim 1, wherein the plastic material is a polyethylene.

10. The process of claim 6, wherein the carbon black is thermal black.

11. The process of claim 6, wherein the compatibilizing agent is dibutyl phthalate.

12. The process of claim 6, wherein the plastic material is a polystyrene.

13. The process of claim 6, wherein the plastic material is a polyethylene.

* * * * *